US010289904B2

(12) United States Patent
Sato et al.

(10) Patent No.: US 10,289,904 B2
(45) Date of Patent: May 14, 2019

(54) VEHICLE DISPLAY SYSTEM AND METHOD OF CONTROLLING VEHICLE DISPLAY SYSTEM

(71) Applicant: SUBARU CORPORATION, Tokyo (JP)

(72) Inventors: Noeru Sato, Tokyo (JP); Takeshi Torii, Tokyo (JP); Ryuichi Sumikawa, Tokyo (JP)

(73) Assignee: Subaru Corporation, Tokyo (JP)

( * ) Notice: Subject to any disclaimer, the term of this patent is extended or adjusted under 35 U.S.C. 154(b) by 0 days.

(21) Appl. No.: 15/898,259

(22) Filed: Feb. 16, 2018

(65) Prior Publication Data
US 2018/0268209 A1 Sep. 20, 2018

(30) Foreign Application Priority Data
Mar. 15, 2017 (JP) ................. 2017-050346

(51) Int. Cl.
G06K 9/00 (2006.01)
G06K 9/32 (2006.01)
B60K 35/00 (2006.01)
G02B 27/01 (2006.01)

(52) U.S. Cl.
CPC .......... *G06K 9/00362* (2013.01); *B60K 35/00* (2013.01); *G02B 27/01* (2013.01); *G02B 27/0101* (2013.01); *G06K 9/00241* (2013.01); *G06K 9/3233* (2013.01); *B60K 2350/1076* (2013.01); *B60K 2350/962* (2013.01); *B60R 2300/205* (2013.01)

(58) Field of Classification Search
CPC combination set(s) only.
See application file for complete search history.

(56) References Cited

U.S. PATENT DOCUMENTS

| 2010/0117381 | A1* | 5/2010 | Sung ............ B60Q 1/2669 292/336.3 |
| 2014/0223531 | A1* | 8/2014 | Outwater ........ H04L 63/0861 726/7 |
| 2015/0046027 | A1* | 2/2015 | Sura ............ B60K 35/00 701/36 |
| 2017/0148216 | A1* | 5/2017 | Birman ............ G01J 1/0425 |

FOREIGN PATENT DOCUMENTS

| JP | 2007-052719 A | 3/2007 |
| JP | 2007-206934 A | 8/2007 |
| JP | 2016-201008 A | 12/2016 |
| JP | 2017-009317 A | 1/2017 |
| JP | 2018-097514 A | 6/2018 |

OTHER PUBLICATIONS

Japanese Office Action issued in corresponding Japanese Patent Application No. 2017-050346, dated Jan. 8, 2019, with English Translation.

* cited by examiner

*Primary Examiner* — Thomas S McCormack
(74) *Attorney, Agent, or Firm* — McDermott Will & Emery LLP

(57) ABSTRACT

A vehicle display system includes a display device, an authentication device, and a display controller. The display device is mounted on a vehicle. The authentication device is configured to perform authentication of an intended person present outside the vehicle. The display controller is configured to control, on a basis of a result of the authentication, the display device to perform displaying that is directed to the intended person.

12 Claims, 9 Drawing Sheets

VEHICLE DISPLAY SYSTEM AND METHOD OF CONTROLLING VEHICLE DISPLAY SYSTEM

CROSS-REFERENCE TO RELATED APPLICATIONS

The present application claims priority from Japanese Patent Application No. 2017-050346 filed on Mar. 15, 2017, the entire contents of which are hereby incorporated by reference.

BACKGROUND

The technology relates to a vehicle display system and a method of controlling the vehicle display system.

For example, Japanese Unexamined Patent Application Publication (JP-A) No. 2007-52719 discloses a technique that displays, on an outer surface of a display glass panel, i.e., a window of a vehicle, a message directed to a surrounding of the vehicle.

SUMMARY

An aspect of the technology provides a vehicle display system that includes: a display device mounted on a vehicle; an authentication device configured to perform authentication of an intended person present outside the vehicle; and a display controller configured to control, on a basis of a result of the authentication, the display device to perform displaying that is directed to the intended person.

An aspect of the technology provides a method of controlling a vehicle display system. The method includes: performing authentication of an intended person present outside a vehicle, the vehicle having a display device; and controlling, on a basis of a result of the authentication, the display device to perform displaying that is directed to the intended person.

An aspect of the technology provides a vehicle display system that includes: a display device mounted on a vehicle; and circuitry configured to perform authentication of an intended person present outside the vehicle, and control, on a basis of a result of the authentication, the display device to perform displaying that is directed to the intended person.

DETAILED DESCRIPTION

Figure 1:
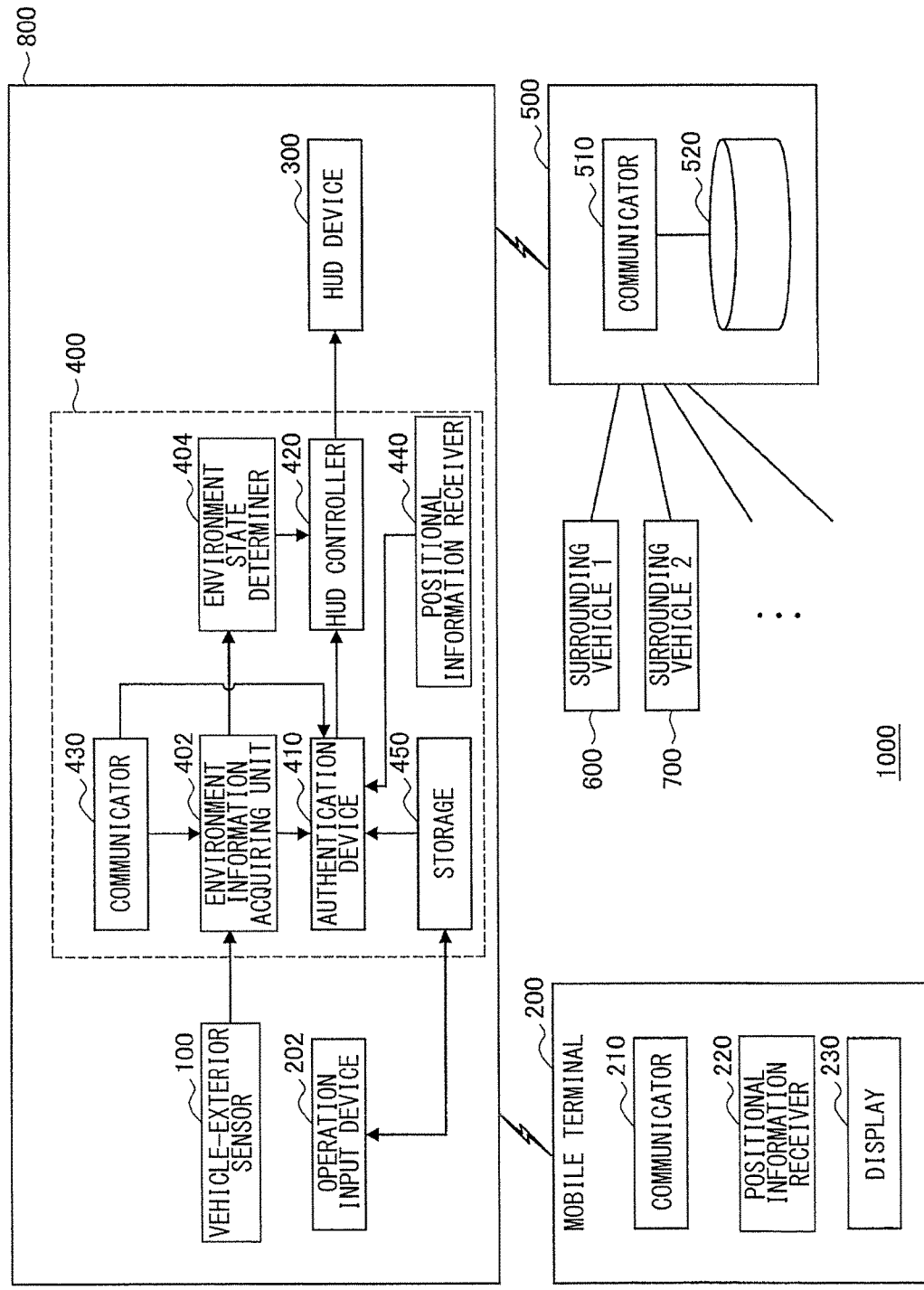
FIG. 1 schematically illustrates an example of a configuration of a vehicle display system according to one implementation of the technology.

A technique disclosed in JP-A No. 2007-52719 involves difficulty in determining to whom a message displayed on outer side of a display glass panel is delivered.

It is desirable to provide a vehicle display system and a method of controlling the vehicle display system that are able to perform, on a display device mounted on a vehicle, displaying directed to a particular intended person outside the vehicle.

In the following, some non-limiting implementations of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example implementations which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description.

As described above, a technique disclosed in JP-A No. 2007-52719 involves difficulty in determining to whom a message displayed on outer side of a window of a vehicle is delivered. A further concern is that, in a situation where a driver stops the vehicle and waits inside the vehicle for the arrival of a meeting partner, it may take time for the meeting partner to find the intended vehicle when many vehicles are at a meeting place.

At least one implementation of the technology therefore provides a vehicle display system and a method of controlling the vehicle display system that are able to perform, on a display device mounted on a vehicle, displaying directed to a particular intended person outside the vehicle.

FIG. 1 schematically illustrates an example of a configuration of a vehicle display system 1000 according to one implementation of the technology. The vehicle display system 1000 may basically relate to a vehicle and a person that uses the vehicle. The vehicle may be, for example but not limited to, an automobile. Referring to FIG. 1, the vehicle display system 1000 may include a vehicle-exterior sensor 100, an operation input device 202, a controller 400, and a head-up display (HUD) device 300 that are mounted on a vehicle 800. The vehicle display system 1000 may also include a mobile terminal 200, a server, 500, and surrounding vehicles 600 and 700. The mobile terminal 200 may belong to a meeting partner 900 who is scheduled to meet with an occupant, such as a driver, of the vehicle 800. As used herein, the term "occupant" encompasses the driver of the vehicle 800.

The vehicle-exterior sensor 100 may be a stereo camera, a monocular camera, millimeter wave radar, an infrared sensor, or any other sensor usable for the vehicle 800. The vehicle-exterior sensor 100 may measure a factor such as, but not limited to, a position and a speed of an object around the own vehicle 800. Non-limiting examples of the object may include a person and a vehicle. In an example implementation where the vehicle-exterior sensor 100 is the stereo camera, the stereo camera may include a pair of right and left cameras each having an imaging device such as, but not limited to, a charge-coupled device (CCD) sensor and a complementary metal-oxide semiconductor (CMOS) sensor. The stereo camera may perform imaging of an external environment outside the vehicle 800, and transmit information on thus-captured images to the controller 400. In an example implementation, the stereo camera may be a color camera disposed at an upper part of a windshield of the vehicle 800 and able to acquire color information.

The operation input device 202 may be a touch panel and/or any other device that allows for input of information. The operation input device 202 may receive information on operation performed by the occupant such as, but not limited to, the driver and a fellow passenger. The occupant is able to input information on features of the meeting partner 900 through operating the operation input device 202. The information on the features may be directed to color of clothes, height, and/or any other features that indicate the meeting partner 900.

The HUD device 300 may provide information directly to a human visual field. The HUD device 300 may display a real image on a window such as, but not limited to, the windshield and a rear window of the vehicle 800. Note that an HUD device typically displays a virtual image; however, the HUD device 300 according to one implementation may provide the real image, making it possible to visually recognize displaying from both inside and outside of the vehicle 800 owing to a viewing angle of substantially 360 degrees derived from the real image displayed by the HUD device 300. In an alternative implementation, however, the HUD device 300 may display the virtual image.

Figure 2:
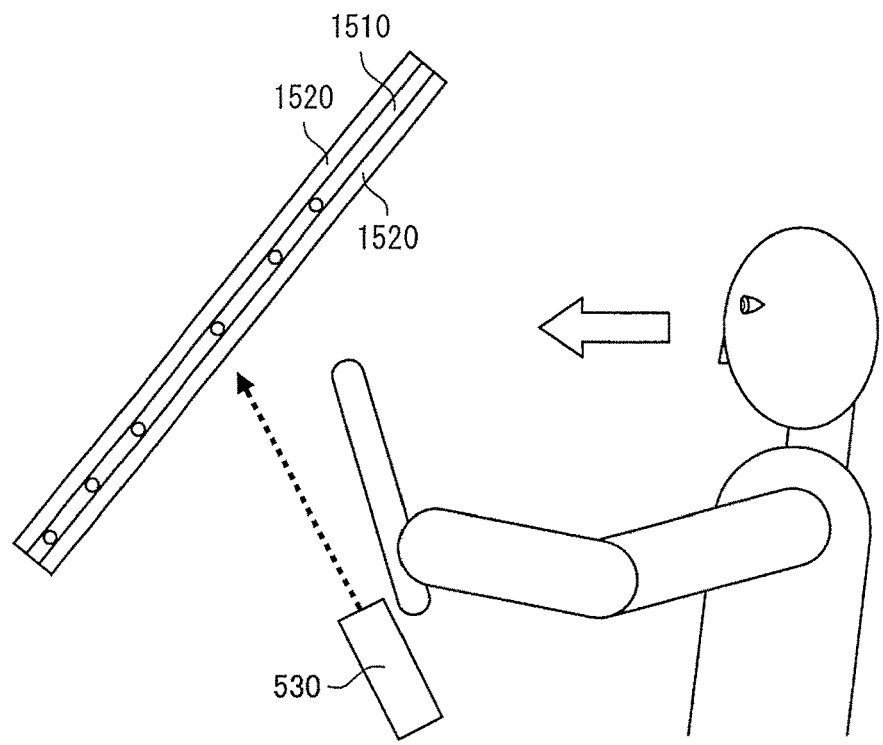
FIG. 2 schematically illustrates an example of a head-up display (HUD) device that uses a self-luminous interlayer film.

In one specific but non-limiting implementation, the HUD device 300 may be a device that uses a self-luminous interlayer film 1510 as illustrated in FIG. 2. In such an implementation, the self-luminous interlayer film 1510 may have a configuration in which the self-luminous interlayer film 1510 is sandwiched between two sheets of glass 1520 that are disposed on the front and back of the self-luminous interlayer film 1510, and may be disposed at the window of the vehicle 800 such as, but not limited to, the windshield and the rear window. The self-luminous interlayer film 1510 may contain a material that emits light, and part of the self-luminous interlayer film 1510 irradiated with laser light may thus emit light upon application of the laser light, thereby displaying characters and images. The laser light may be applied from a projector 530 provided inside the vehicle 800. Such an object thus displayed may have a visibility from all angles and may be thus visually recognizable not only from a driver's seat but also from any seat besides the driver's seat and any location outside the vehicle 800.

In an alternative implementation, the HUD device 300 may have a configuration in which a self-luminous device is disposed at the window of the vehicle 800. In such an alternative implementation, the HUD device 300 may utilize a transparent screen based on an organic electroluminescence (EL) element, may utilize a transmissive liquid crystal device, or may utilize any other member that allows for transmissive displaying. In a further alternative implementation, any device other than the HUD device 300 may be used as a display device. In such an alternative implementation, a large-sized liquid crystal display device, a light-emitting diode (LED) display device, or any display device provided on a member such as, but not limited to, an instrument panel may be used as the display device. In the following, a description is given of one implementation in which the HUD device 300 performs displaying on the window, such as the windshield and the rear window, of the vehicle 800. In one implementation, the HUD device 300 may serve as a "display device". The display device according to any implementation of the technology, however, is not limited to the HUD device 300. The term "HUD device" or "display device" according to any implementation of the technology encompasses any and all display devices provided inside and/or outside a vehicle. In an example implementation, the display device may be provided at any location outside the vehicle 800 other than the window, such as a body of the vehicle 800. In an example implementation, the display device may be provided at any location inside the vehicle 800 other than the window, such as the instrument panel and a seat. The display device located inside the vehicle 800 and the display device located outside the vehicle 800 may be provided integrally, or may be provided separately. Accordingly, the wording "mounted on" the vehicle as used herein and its variants are intended to encompass both an implementation in which the display device is located inside the vehicle 800 and an implementation in which the display device is located outside the vehicle 800.

The controller 400 may be provided in the vehicle 800, and may include an environment information acquiring unit 402, an environment state determiner 404, an authentication device 410, an HUD controller 420, a communicator 430, a positional information receiver 440, and a storage 450. In one implementation, the environment information acquiring unit 402 may serve as an "image information acquiring unit". In one implementation, the environment state determiner 404 may serve as a "determiner". In one implementation, the authentication device 410 may serve as an "authentication device". In one implementation, the HUD controller 420 may serve as a "display controller". The HUD controller 420 may control the HUD device 300. The communicator 430 may perform communication with the mobile terminal 200. The positional information receiver 440 may receive positional information, and may be, for example but not limited to, a global positioning system (GPS). The storage 450 may store information such as, but not limited to, registration information and registration image information. The registration information may be directed to authentication of identification information of the mobile terminal 200, and registration image information may be directed to authentication of image information on the meeting partner 900. The mobile terminal 200 may include a communicator 210, a positional information receiver 220, and a display 230. The communicator 210 may perform communication with the communicator 430 of the controller 400. The positional information receiver 220 may receive positional information, and may be, for example but not limited to, the GPS. The server 500 may be provided on a cloud without limitation, and may include a communicator 510 and a database 520. The communicator 510 may perform communication with one or more of the communicator 430 provided in the controller 400, the surrounding vehicle 600, and the surrounding vehicle 700. Note that one or more of elements of the controller 400 may be configured by hardware such as, but not limited to, a circuit. In an alternative implementation, one or more of the elements of the controller 400 may be configured by a processor and software such as, but not limited to, a program, that causes the processor to function. The processor may be, for example but not limited to, a central processing unit (CPU).

The environment information acquiring unit 402 may acquire information on a distance relative to a target object, i.e., distance information. In an example implementation, the environment information acquiring unit 402 may generate the distance information on the basis of an amount of shift between corresponding positions in a pair of right and left stereo images and by means of principle of triangulation. The pair of right and left stereo images may be acquired as a result of the imaging performed by a set of right and left cameras of the stereo camera that configures the vehicle-exterior sensor 100 in one implementation. Together with the acquisition of the distance information, the environment information acquiring unit 402 may also acquire positional information of the object, from image information obtained by the imaging performed by the set of right and left cameras of the stereo camera that configures the vehicle-exterior sensor 100. Further, the environment information acquiring unit 402 may perform a known grouping process on the distance information thus generated by the principle of triangulation to detect, in the form of data, factors such as, but not limited to, a three-dimensional object and a lane line. The environment information acquiring unit 402 may perform the detection of the factors by comparing the distance information having been subjected to the grouping process with preset three-dimensional data such as, but not limited to, three-dimensional object data. By the processes performed by the environment information acquiring unit 402, the controller 400 is also able to recognize factors such as, but not limited to, a person, another vehicle, a stop sign, a stop line, and an electronic toll collection (ETC) gate.

The environment information acquiring unit 402 may also calculate one or more of an amount of variation in distance relative to a factor and a speed relative to the factor, on the basis of the distance information relative to the factor generated by the principle of triangulation. Non-limiting examples of the factor may include a person and another vehicle. The amount of variation in distance may be determined by integrating a distance between frame images. The frame image may be acquired per unit time. The relative speed may be determined by dividing the distance acquired per unit time by the unit time.

In an example implementation where the vehicle-exterior sensor 100 is a camera, the image captured by the vehicle-exterior sensor 100 may be supplied to the controller 400. The environment information acquiring unit 402, serving as the image information acquiring unit in one implementation, may acquire a face region of the meeting partner 900 on the basis of the received image, and may acquire an orientation of the face of the meeting partner 900 on the basis of the face region. The environment information acquiring unit 402 may acquire the face region by means of an image processing technique such as, but not limited to, an edge detection and a face detection. The environment state determiner 404 may determine whether the meeting partner 900 notices the vehicle 800 on the basis of the orientation of the face.

Figure 3:
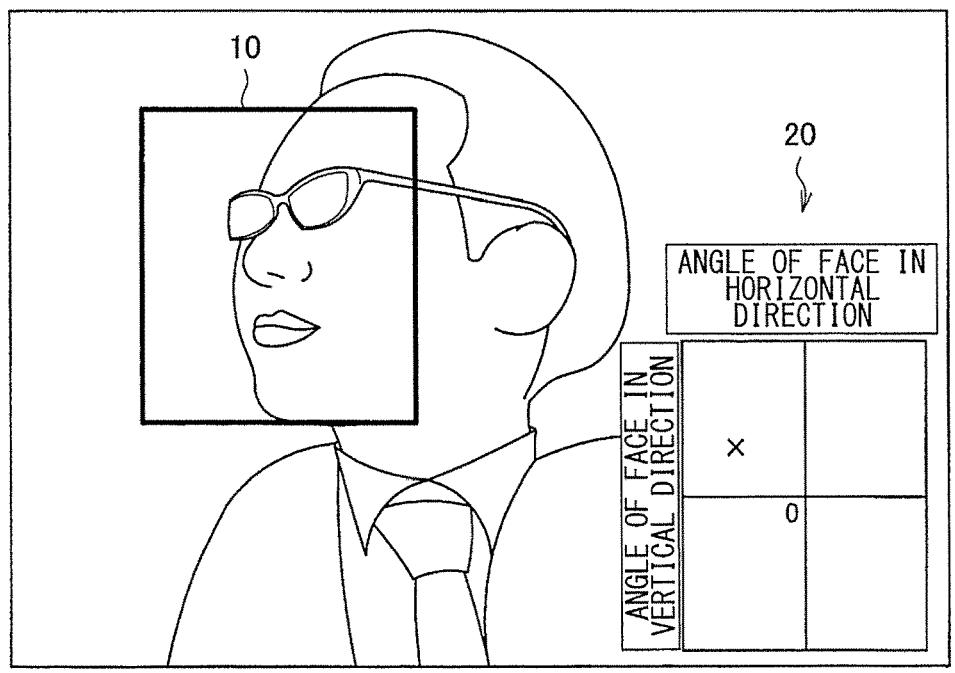
FIG. 3 schematically illustrates an example where calculation of factors, including an angle at which the face is oriented, is performed on the basis of a face region of a meeting partner.

FIG. 3 schematically illustrates an example where calculation of factors, including an angle at which the face is oriented, is performed on the basis of a detected face region 10 of the meeting partner 900. The environment state determiner 404 may determine whether the meeting partner 900 notices the vehicle 800, by performing monitoring as to whether the orientation of the face of the meeting partner 900 is off a predetermined region on the basis of the face region 10 of the meeting partner 900 obtained from the image information. The face region 10 of the meeting partner 900 may be set on the basis of the positional information on feature points of respective sites of the face. Non-limiting examples of the sites of the face may include eyes, nose, and mouth.

FIG. 3 also illustrates, at the bottom right, an example of a detection result 20 obtained by the environment information acquiring unit 402. The detection result 20 may represent an "angle of face in vertical direction" on the vertical axis and an "angle of face in horizontal direction" on the horizontal axis. An "x" mark 30 denotes the detected orientation of the face.

Hence, the environment information acquiring unit 402 may acquire the image information that is obtained from the vehicle-exterior sensor 100 and directed to an environment outside the vehicle 800. Further, the environment information acquiring unit 402 may perform an analysis of the thus-acquired image information on the basis of an image analyzing process. By performing the analysis of the image information, the environment information acquiring unit 402 may acquire environment information directed to the environment outside the vehicle 800.

Incidentally, in an example situation where the occupant, such as the driver, stops the vehicle 800 and waits inside the vehicle 800 for the arrival of the meeting partner 900, it may take time for the meeting partner 900 to find the intended vehicle 800. In particular, it takes a long time for the meeting partner 900 to find the intended vehicle 800 especially when, for example, the meeting partner 900 sees the vehicle 800 belonging to the occupant for the first time, or the meeting partner 900 does not remember the vehicle 800. It also takes a long time for the meeting partner 900 to find the intended vehicle 800 when there are many stopped vehicles, such as when the occupant meets the meeting partner 900 in front of a station, or any other location where many vehicles are present. Further, when the vehicle 800 is colored in white, black, etc., and a large-number of vehicles are present that are same in color as the vehicle 800, it takes a long time for the meeting partner 900 to find the intended vehicle 800 as well.

In an example implementation, authentication is performed of a person outside the vehicle 800, i.e., the meeting partner 900, and the HUD device 300 is caused to perform displaying outside the vehicle 800 in accordance with a result of the authentication. In one specific but non-limiting implementation, when the authentication is successful as a result of the authentication and a person outside the vehicle 800 corresponds to a person registered in advance, a particular message directed to the person may be displayed outside the vehicle 800. Thus, the meeting partner 900 is able to find the intended vehicle 800 easily and in a short time by seeing a window of the vehicle 800.

The authentication of the meeting partner 900 is performed by the authentication device 410 of the controller 400. The authentication device 410 may perform the authentication of the meeting partner 900 by comparing the identification information transmitted from the mobile terminal 200 belonging to the meeting partner 900 with the registration information registered in advance in the controller 400. The authentication device 410 may perform the authentication of the meeting partner 900 by comparing the image information acquired by the vehicle-exterior sensor 100 with the registration image information registered in advance in the controller 400. The authentication device 410 may determine, when the authentication is successful, whether the mobile terminal 200 belonging to the meeting partner 900 is near the own vehicle 800.

Figure 4:
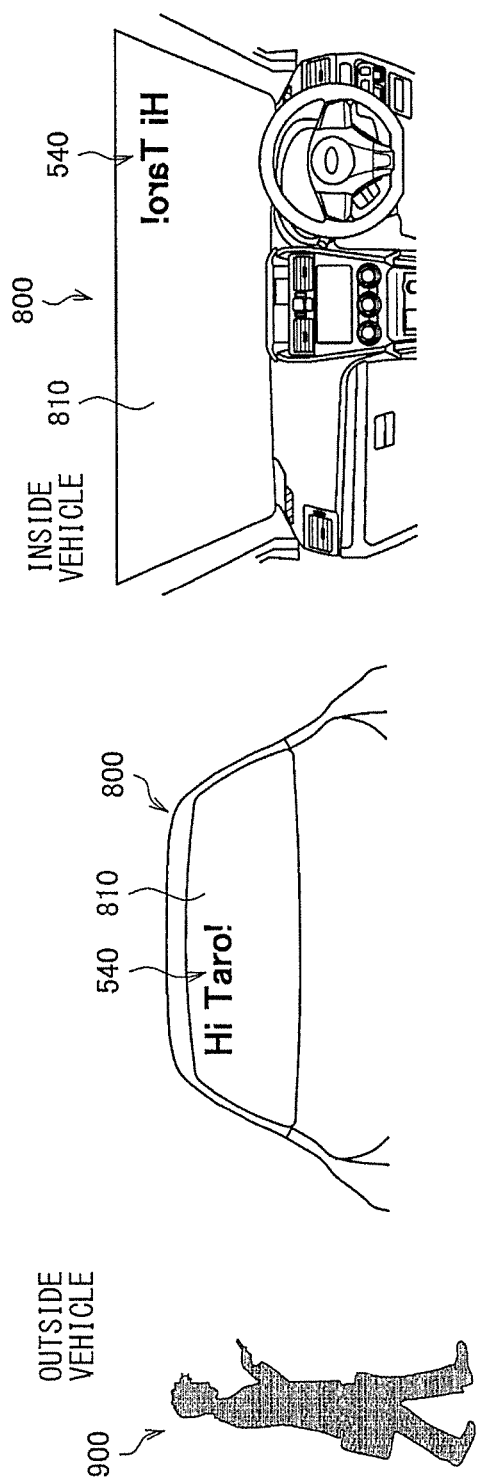
FIG. 4 schematically illustrates a state in which an image is displayed on a windshield of a vehicle by means of the HUD device, when authentication performed by an authentication device is successful.
Figure 5:
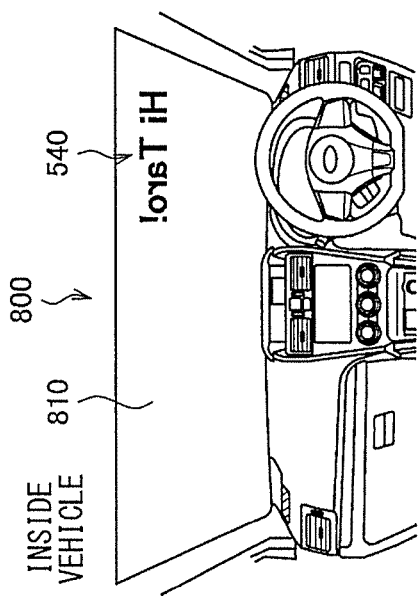
FIG. 5 schematically illustrates a state in which the image is displayed on the windshield of the vehicle by means of the HUD device, when the authentication performed by the authentication device is successful.
Figure 5:
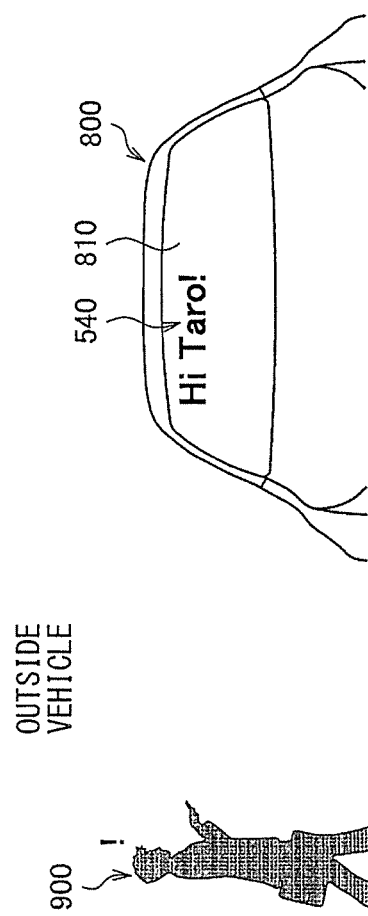
Figure 6:
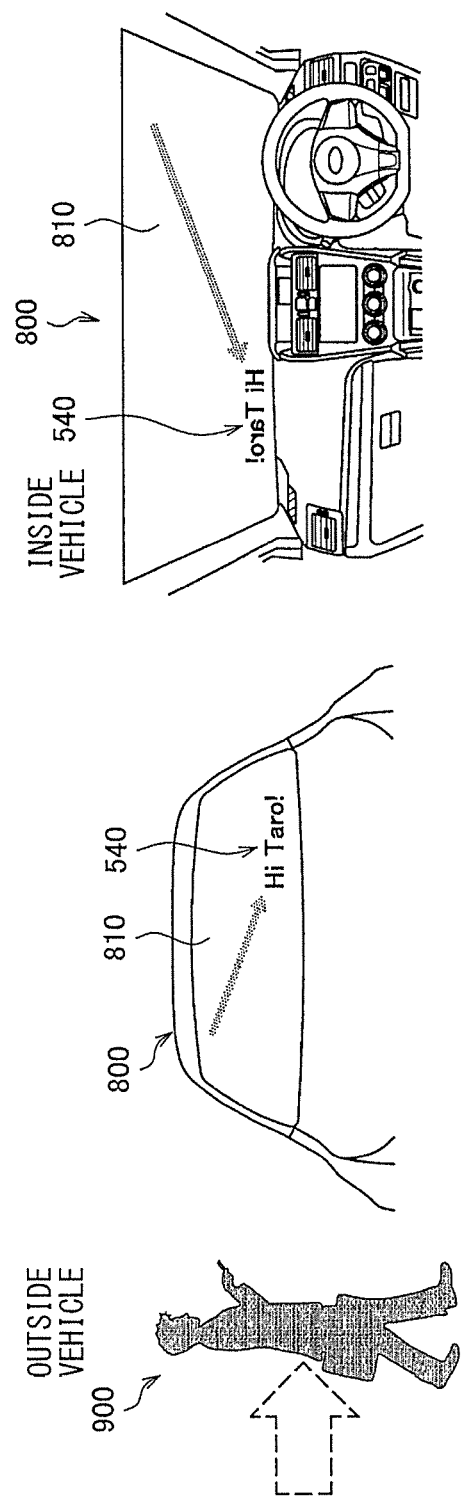
FIG. 6 schematically illustrates a state in which the image is displayed on the windshield of the vehicle by means of the HUD device, when the authentication performed by the authentication device is successful.

FIGS. 4 to 6 each schematically illustrate a state in which an image 540 is displayed on a windshield 810 of the vehicle 800 by means of the HUD device 300, when the authentication performed by the authentication device 410 is successful. In FIGS. 4 to 6, a left part of each drawing of the vehicle 800 illustrates an example case where the image 540 is seen from the outside of the vehicle 800, whereas a right part of each drawing of the vehicle 800 illustrates an example case where the image 540 is seen from the inside of the vehicle 800.

Referring to FIG. 4, when the authentication is successful, the image 540 may be displayed at a position easily seen by the meeting partner 900. Thus, the meeting partner 900 is able to find the intended vehicle 800 easily and in a short time by seeing the image 540 as illustrated in FIG. 5.

In an example implementation, the nickname such as "Taro" may be displayed as illustrated in FIG. 4 when a permission to display the nickname is given in advance by the meeting partner 900. The family name, or any other personally identifiable information, may be displayed alternatively when a permission is given in advance by the meeting partner 900. In an alternative implementation, any image that makes sense only between the meeting partner 900 and the occupant such as the driver may be displayed on the basis of a prior arrangement made between the meeting partner 900 and the occupant.

FIG. 6 schematically illustrates an example case where a priority is placed on driver's visibility by changing a factor of the image 540 such as a position and a size of the image 540. In an example implementation illustrated in FIG. 6, the image 540 may be displayed small at an end of the windshield 810, making it possible to increase the visibility when the driver sees the front while being seated.

Figure 7:
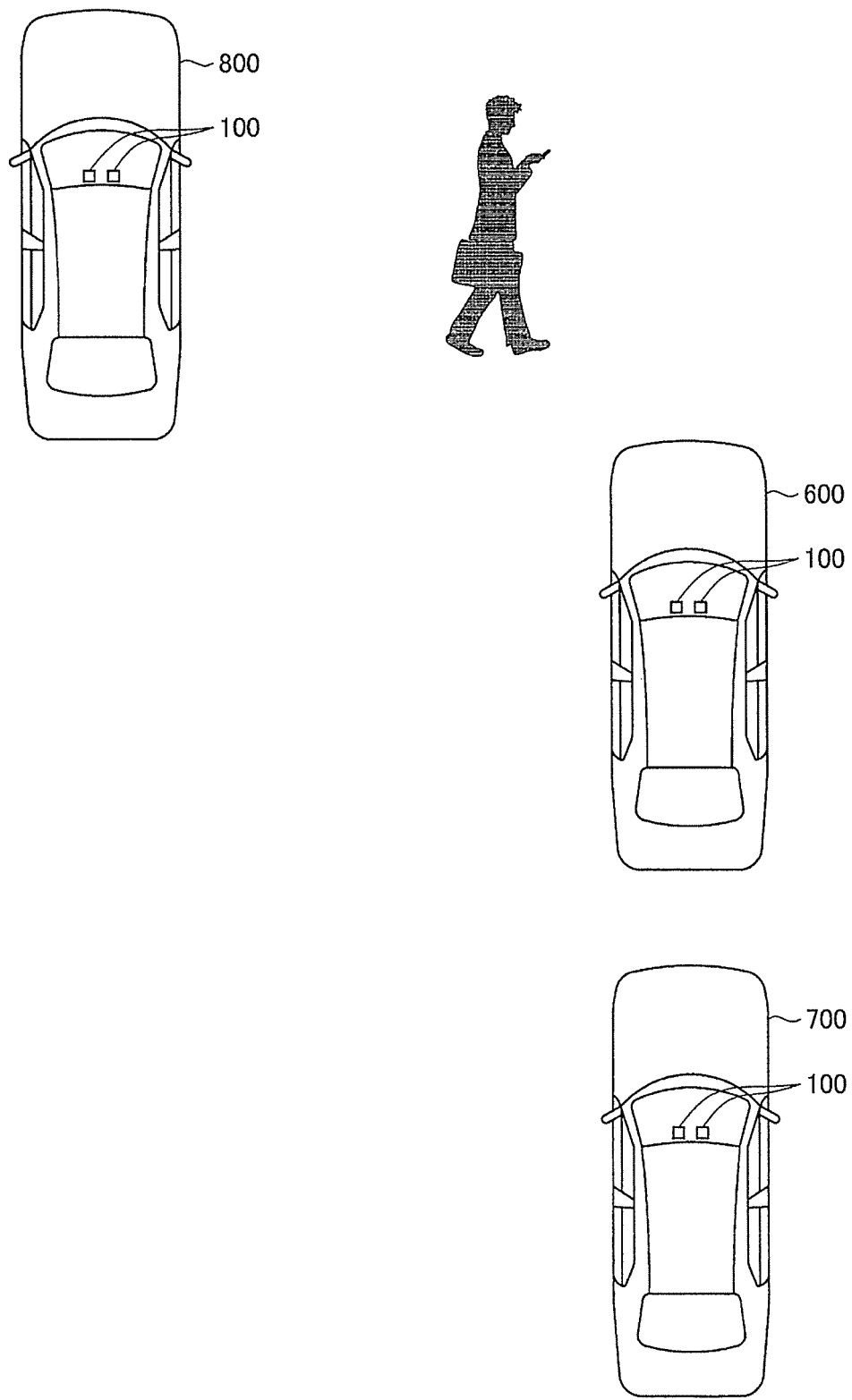
FIG. 7 schematically illustrates an example of authentication that utilizes surrounding vehicles.

FIG. 7 schematically illustrates an example of the authentication that utilizes the surrounding vehicles 600 and 700. The surrounding vehicles 600 and 700 each may have a configuration similar to that of the vehicle 800, and may have the vehicle-exterior sensor 100. The image information acquired by the vehicle-exterior sensor 100 of one or both of the surrounding vehicles 600 and 700 may be transmitted to the server 500. The image information transmitted to the server 500 may be transmitted from the server 500 to the controller 400 of the vehicle 800. The environment information acquiring unit 402, serving as the image information acquiring unit in one implementation, may acquire the image information transmitted to the controller 400. The authentication device 410 of the controller 400 may perform the authentication of the meeting partner 900 by comparing the image information acquired by the vehicle-exterior sensor 100 of one or both of the surrounding vehicles 600 and 700 with the registration image information registered in advance in the controller 400. Performing the authentication that utilizes the surrounding vehicles 600 and 700 makes it possible to ensure that the authentication of the meeting partner 900 is performed even when the vehicle 800 is unable to perform the authentication of the meeting partner 900 directly.

For example, the vehicle-exterior sensor 100 of the vehicle 800 may sometimes not be able to acquire the image information of the meeting partner 900 in an example case where the meeting partner 900 is relatively distant from the vehicle 800, or where the meeting partner 900 is at a blind spot of the vehicle-exterior sensor 100 of the vehicle 800. In such circumstances, however, it is still possible to perform the authentication on the basis of the image information acquired by the vehicle-exterior sensor 100 of one or both of the surrounding vehicles 600 and 700.

Figure 8:
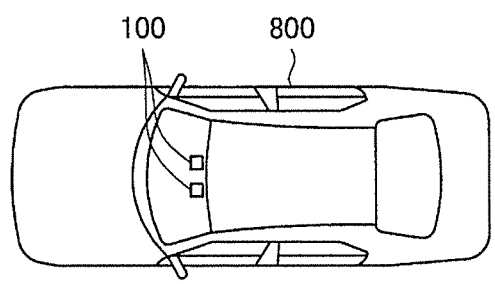
FIG. 8 schematically illustrates an example of a method of determining whether the meeting partner notices the vehicle.
Figure 8:
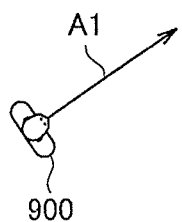

In an example implementation, the image 540 may be made less conspicuous by changing a position, a size, and/or any other factor, of the displaying performed outside the vehicle 800 when the meeting partner 900 notices the intended vehicle 800. FIG. 8 schematically illustrates an example of a method of determining whether the meeting partner 900 notices the vehicle 800, where both the vehicle 800 and the meeting partner 900 are seen from above. Referring to FIG. 8, detecting the meeting partner 900 by the vehicle-exterior sensor 100 and detecting the orientation of the face of the meeting partner 900 define an arrow A1 that represents the orientation of the face with a position W of the meeting partner 900 being a starting point. Hence, the environment state determiner 404 may determine that the meeting partner 900 notices the vehicle 800 when the arrow A1 points toward the vehicle 800.

Figure 9A:
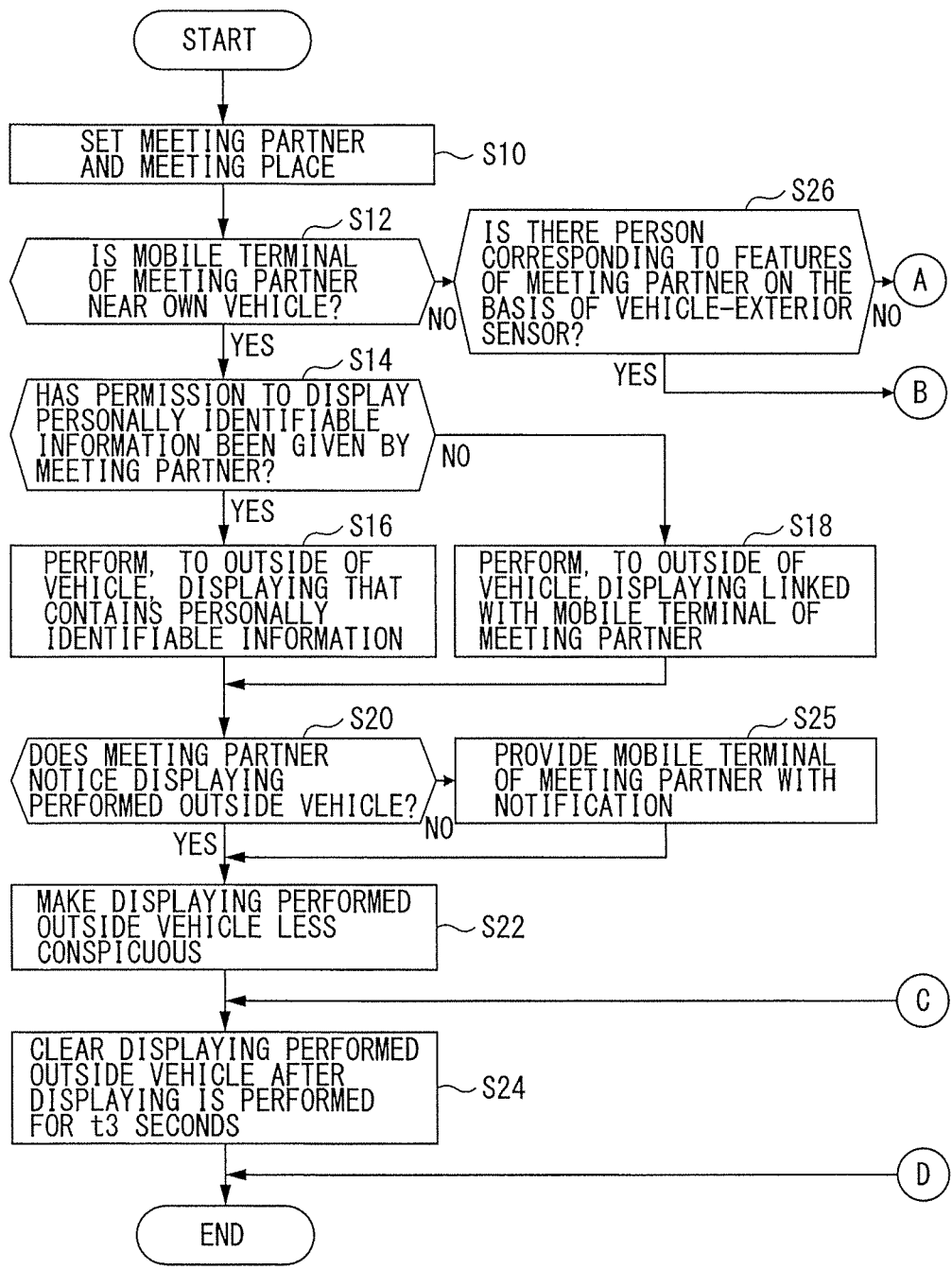
FIGS. 9A and 9B are each a flowchart illustrating an example of a process performed in the vehicle display system according to one implementation of the technology.
Figure 9B:
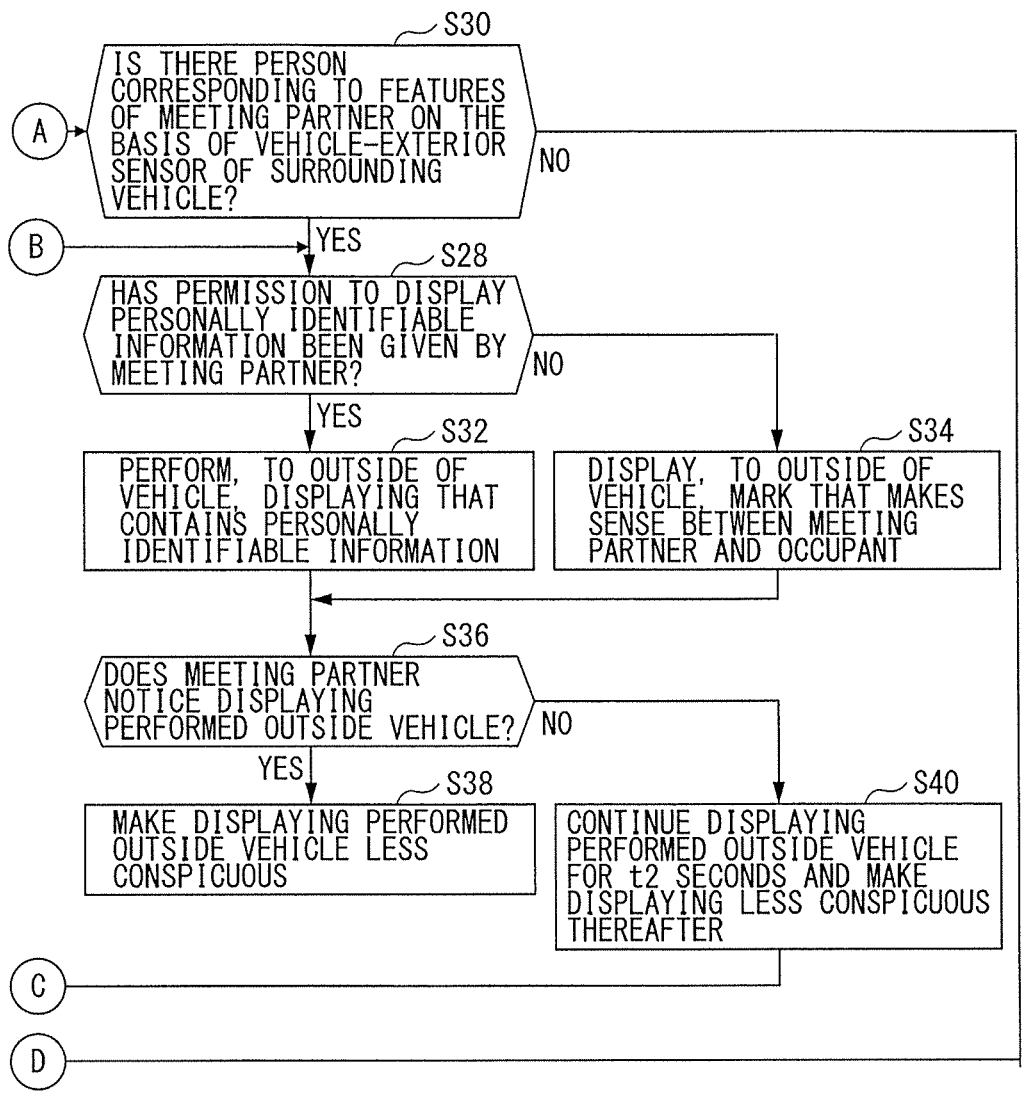

A description is given next, with reference to a flowchart illustrated in FIGS. 9A and 9B, of an example of a process performed in the vehicle display system 1000 according to one implementation. First, in step S10, a factor such as the meeting partner 900 and a meeting place may be set. In an example implementation, the occupant may input the information on the features of the meeting partner 900 through operating the operation input device 202. The information on the features of the meeting partner 900 may be once stored in the storage 450.

Thereafter, in step S12, the communicator 430 of the controller 400 may communicate with the mobile terminal 200 belonging to the meeting partner 900, and the authentication device 410 may perform the authentication on the basis of the identification information of the mobile terminal 200. Further, in step S12, the positional information of the mobile terminal 200 may be acquired, and the positional information of the mobile terminal 200 and the positional information of the vehicle 800 that is obtained by the positional information receiver 440 may be compared with each other. By performing the comparison, a determination may be made in step S12 as to whether the mobile terminal 200 belonging to the meeting partner 900 is near the own vehicle 800.

The flow may proceed to step S14 when the authentication is successful and the mobile terminal 200 belonging to the meeting partner 900 is determined as being near the own vehicle 800 (S12: YES). In step S14, a determination may be made as to whether the permission to display the personally identifiable information, such as the family name and the nickname, has been given by the meeting partner 900. The flow may proceed to step S16 when the permission has been given (S14: YES). In an example implementation, information on whether the permission to display the personally identifiable information, such as the family name and the nickname, has been given may be stored in advance in the storage 450. In an alternative implementation, the information on whether the permission has been given may be inputted by the occupant in step S10. In step S16, the displaying may be performed outside the vehicle 800. The displaying may contain the personally identifiable information, such as the family name and the nickname, of the occupant of the vehicle 800, the meeting partner 900, or both.

The flow may proceed to step S18 when the permission to display the personally identifiable information, such as the family name and the nickname, has not been given by the meeting partner 900 in step S14 (S14: NO). In step S18, displaying linked with the mobile terminal 200 of the meeting partner 900 may be performed outside the vehicle 800. In one specific but non-limiting implementation, in step S18, the HUD device 300 may display a predetermined mark, and information on the mark may be transmitted to the mobile terminal 200 to cause the display 230 of the mobile terminal 200 to display the same mark. This allows the meeting partner 900 to compare the mark displayed on the mobile terminal 200 with the mark displayed by the HUD device 300, and to thereby find the intended vehicle 800 having the corresponding mark.

The flow may proceed to step S20 after step S16 or S18. In step S20, a determination may be made as to whether the meeting partner 900 notices the displaying performed outside the vehicle 800. The determination in step S20 may be made on the basis of the non-limiting method described above with reference to FIG. 8. The flow may proceed to step S22 when the meeting partner 900 notices the displaying performed outside the vehicle 800 (S20: YES). In step S22, the displaying performed outside the vehicle 800 may be made less conspicuous by changing a factor such as the position and the size of the displaying. Thereafter, in step S24, the displaying performed outside the vehicle 800 may be cleared after the displaying is performed for "t3" seconds. The process may end after step S24 is performed (END).

When a determination is made in step S20 that the meeting partner 900 does not notice the displaying performed outside the vehicle 800 (S20: NO), the flow may proceed to step S25. In step S25, the communication may be performed with the mobile terminal 200 of the meeting partner 900 to provide the mobile terminal 200 with a notification. In an example implementation, a notification may be sent to the mobile terminal 200 that prompts the meeting partner 900 to see a window of the stopped vehicle 800. After step S25, the flow may proceed to step S22 in which the displaying performed outside the vehicle 800 may be made less conspicuous by changing a factor such as the position and the size of the displaying.

The flow may proceed to step S26 when the authentication in step S12 is not successful (S12: NO). In step S26, the authentication device 410 may compare the image information of the meeting partner 900 obtained from the information that is derived from the vehicle-exterior sensor 100 with the registration image information registered in advance. By performing the comparison, the authentication may be performed in step S26 as to whether a person corresponding to the features of the meeting partner 900 is around the vehicle 800. The flow may proceed to step S28 when the person corresponding to the features of the meeting partner 900 is around the vehicle 800 (S26: YES). The flow may proceed to step S30 when the person corresponding to the features of the meeting partner 900 is not around the vehicle 800 (S26: NO).

In step S30, a determination may be made as to whether there is a person corresponding to the features of the meeting partner 900, on the basis of the image information obtained from the information that is derived from the vehicle-exterior sensor 100 of one or both of the surrounding vehicles 600 and 700. The flow may proceed to step S28 when there is the person corresponding to the features of the meeting partner 900 on the basis of the image information obtained from the information derived from the vehicle-exterior sensor 100 of one or both of the surrounding vehicles 600 and 700 (S30: YES). The process may end (END) when there is no person corresponding to the features of the meeting partner 900 on the basis of the image information obtained from the information derived from the vehicle-exterior sensor 100 of one or both of the surrounding vehicles 600 and 700 (S30: NO).

In step S28, in consideration of a fact that the person corresponding to the features of the meeting partner 900 is around the vehicle 800 on the basis of the image information obtained from the own vehicle 800 or from one or both of the surrounding vehicles 600 and 700, a determination may be made as to whether the permission to display the personally identifiable information, such as the family name and the nickname, has been given by the meeting partner 900. The flow may proceed to step S32 when the permission has been given (S28: YES). In step S32, the displaying may be performed outside the vehicle 800 which contains the personally identifiable information, such as the family name and the nickname, of the occupant of the vehicle 800, the meeting partner 900, or both.

The flow may proceed to step S34 when the permission to display the personally identifiable information, such as the family name and the nickname, has not been given by the meeting partner 900 in step S28 (S28: NO). In step S34, an image, such as a mark, that makes sense between the meeting partner 900 and the occupant of the vehicle 800 may be displayed outside the vehicle 800.

The flow may proceed to step S36 after step S32 or S34. In step S36, a determination may be made as to whether the meeting partner 900 notices the displaying performed outside the vehicle 800. The determination in step S36 may be made on the basis of the non-limiting method described above with reference to FIG. 8. The flow may proceed to step S38 when the meeting partner 900 notices the displaying performed outside the vehicle 800 (S36: YES). In step S38, the displaying performed outside the vehicle 800 may be made less conspicuous by changing a factor such as the position and the size of the displaying.

When a determination is made in step S36 that the meeting partner 900 does not notice the displaying performed outside the vehicle 800 (S36: NO), the flow may proceed to step S40. In step S40, the displaying performed outside the vehicle 800 may be continued for "t2" seconds, following which the displaying may be made less conspicuous by changing a factor such as the position and the size of the displaying. The flow may proceed to step S24 after step S38 or S40. In step S24, the displaying performed outside the vehicle 800 may be cleared after the displaying is performed for "t3" seconds. The process may end after step S24 is performed (END).

According to one implementation described above, it is possible to perform, by a display device mounted on the vehicle 800, the displaying directed to a particular intended person outside the vehicle 800. Specifically, in one implementation, the authentication is performed of the meeting partner 900 outside the vehicle 800 as a non-limiting example of a particular intended person. Further, the displaying is performed by the HUD device 300 as a non-limiting example of the display device, when the authentication is successful. Hence, it is possible to ensure that the meeting partner 900 is able to find the intended vehicle 800 in a short time.

The controller 400 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable tangible medium, to perform all or a part of functions of the controller 400. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the controller 400 illustrated in FIG. 1.

Although some implementations of the technology have been described in the foregoing with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A vehicle display system comprising:
   a display device mounted on a vehicle;
   an image information acquiring unit that acquires, from a surrounding vehicle located around the vehicle via a server provided outside the vehicle, image information of an intended person present outside the vehicle;
   an authentication device configured to perform authentication of the intended person present outside the vehicle based on determining that the acquired image information of the intended person corresponds to registration image information registered in advance; and
   a display controller configured to provide for display on the display device, on a basis of a result of the authentication, an image directed to the intended person.

2. The vehicle display system according to claim 1, wherein
   the authentication device performs the authentication based on determining that identification information of a mobile terminal belonging to the intended person corresponds to the registration information registered in advance, and
   the display controller provides for display on the display device an image directed to the intended person the intended person when the identification information of the mobile terminal corresponds to the registration information.

3. The vehicle display system according to claim 1, wherein the display controller provides for display on the display device the image when a permission is given by the intended person.

4. The vehicle display system according to claim 2, wherein the display controller provides for display on the display device the image when a permission is given by the intended person.

5. The vehicle display system according to claim 2, wherein the display controller provides for display on the display device an image that corresponds to an image displayed on the mobile terminal.

6. The vehicle display system according to claim 1, further comprising a determiner configured to determine whether the intended person notices the vehicle, the vehicle being an own vehicle, wherein
   the display controller dims the image displayed towards the intended person when the determiner determines that the intended person notices the own vehicle.

7. The vehicle display system according to claim 2, further comprising a determiner configured to determine whether the intended person notices the vehicle, the vehicle being an own vehicle, wherein
   the display controller dims the image displayed directed to the intended person when the determiner determines that the intended person notices the own vehicle.

8. The vehicle display system according to claim 3, further comprising a determiner configured to determine whether the intended person notices the vehicle, the vehicle being an own vehicle, wherein
   the display controller dims the image displayed directed to the intended person when the determiner determines that the intended person notices the own vehicle.

9. The vehicle display system according to claim 4, further comprising a determiner configured to determine whether the intended person notices the vehicle, the vehicle being an own vehicle, wherein
   the display controller dims the image displayed directed to the intended person when the determiner determines that the intended person notices the own vehicle.

10. The vehicle display system according to claim 5, further comprising a determiner configured to determine whether the intended person notices the vehicle, the vehicle being an own vehicle, wherein
    the display controller dims the image displayed directed to the intended person when the determiner determines that the intended person notices the own vehicle.

11. A method of controlling a vehicle display system, the method comprising:
    acquiring image information of an intended person present outside a vehicle, the image information is acquired from a surrounding vehicle located around the vehicle via a server provided outside the vehicle;
    authenticating the intended person based on determining that the image of the intended person corresponds to registration image information registered in advance; and
    providing for display on a display device of the vehicle, on a basis of a result of the authentication, an image directed to the intended person the intended person.

12. A vehicle display system comprising:
    a display device mounted on a vehicle; and
    circuitry configured to:
      acquire, from a surrounding vehicle located around the vehicle via a server provided outside the vehicle, image information of an intended person present outside the vehicle;
      authenticate the intended person present outside the vehicle based on determining that the image of the intended person corresponds to registration image information registered in advance; and
      provide for display on the display device, on a basis of a result of the authentication, an image directed to the intended person.

* * * * *